July 2, 1935.  W. J. PENDRY  2,006,477
FOLDING CABIN
Filed April 24, 1933   6 Sheets-Sheet 1

INVENTOR
Wm J. Pendry
BY
ATTORNEY

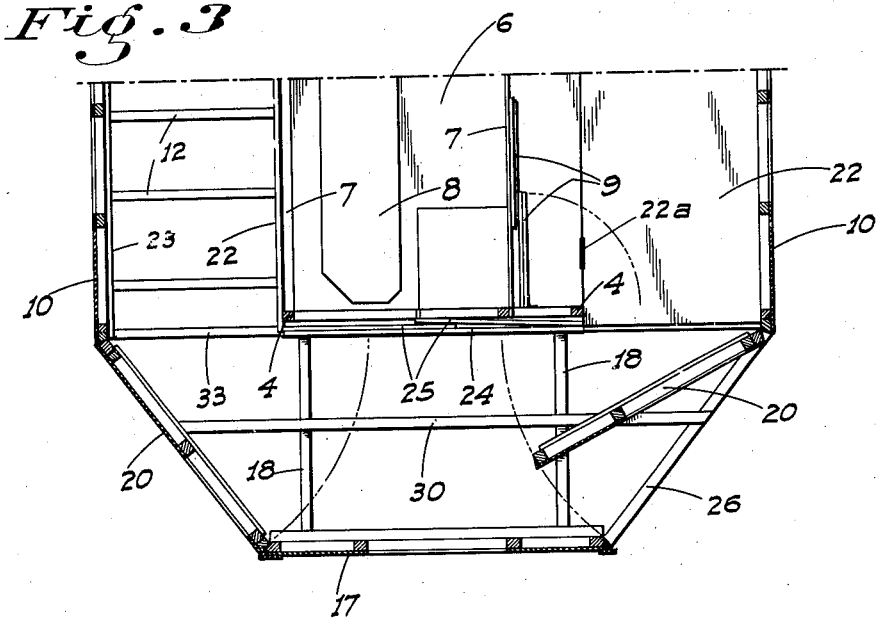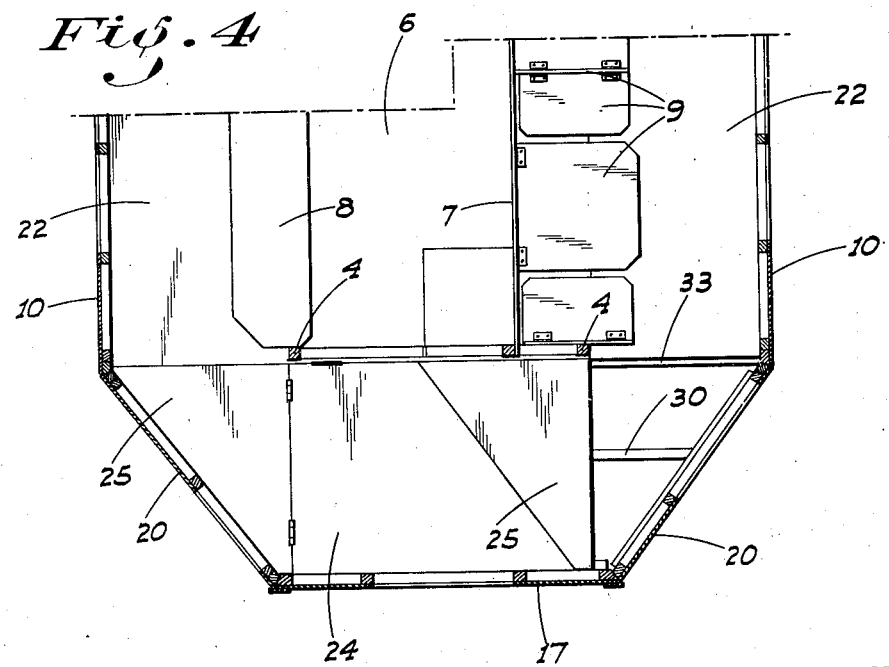

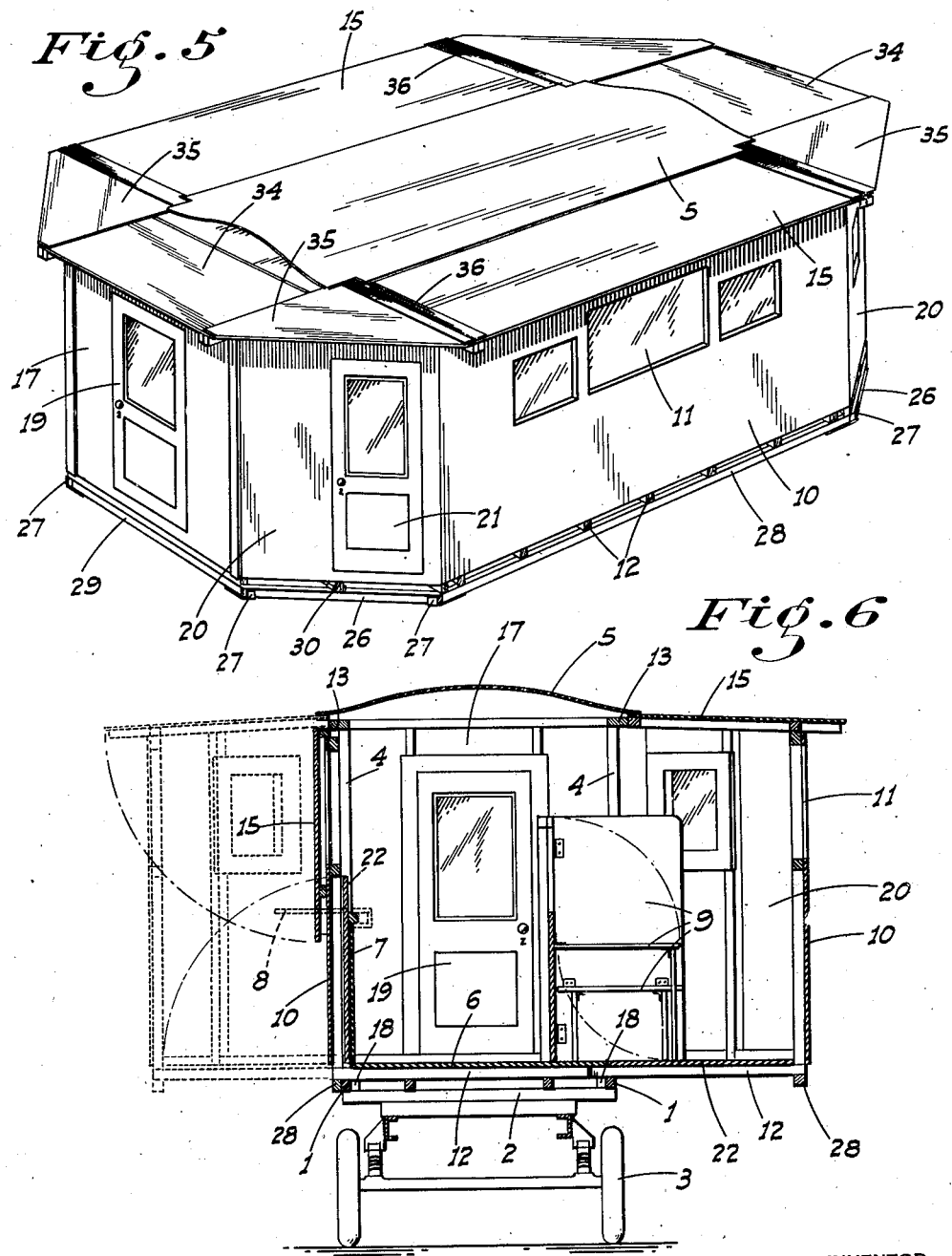

July 2, 1935.  W. J. PENDRY  2,006,477
FOLDING CABIN
Filed April 24, 1933    6 Sheets-Sheet 4

INVENTOR
Wm J. Pendry
BY
ATTORNEY

July 2, 1935.  W. J. PENDRY  2,006,477
FOLDING CABIN
Filed April 24, 1933   6 Sheets-Sheet 5
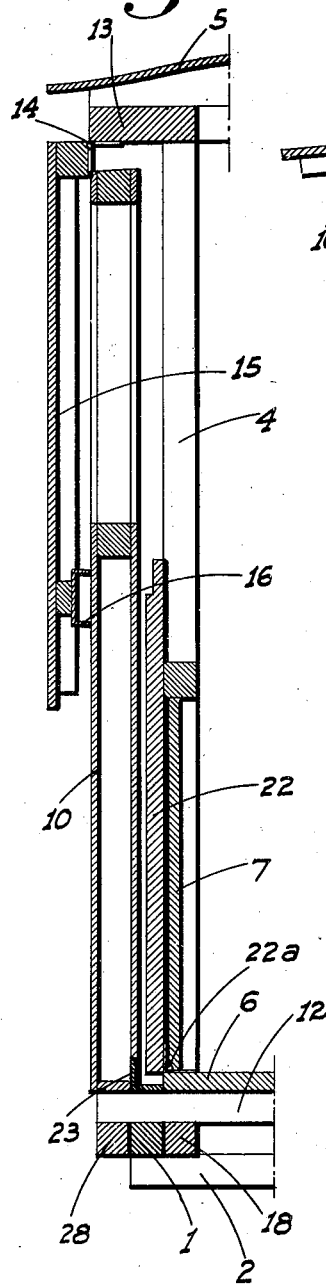
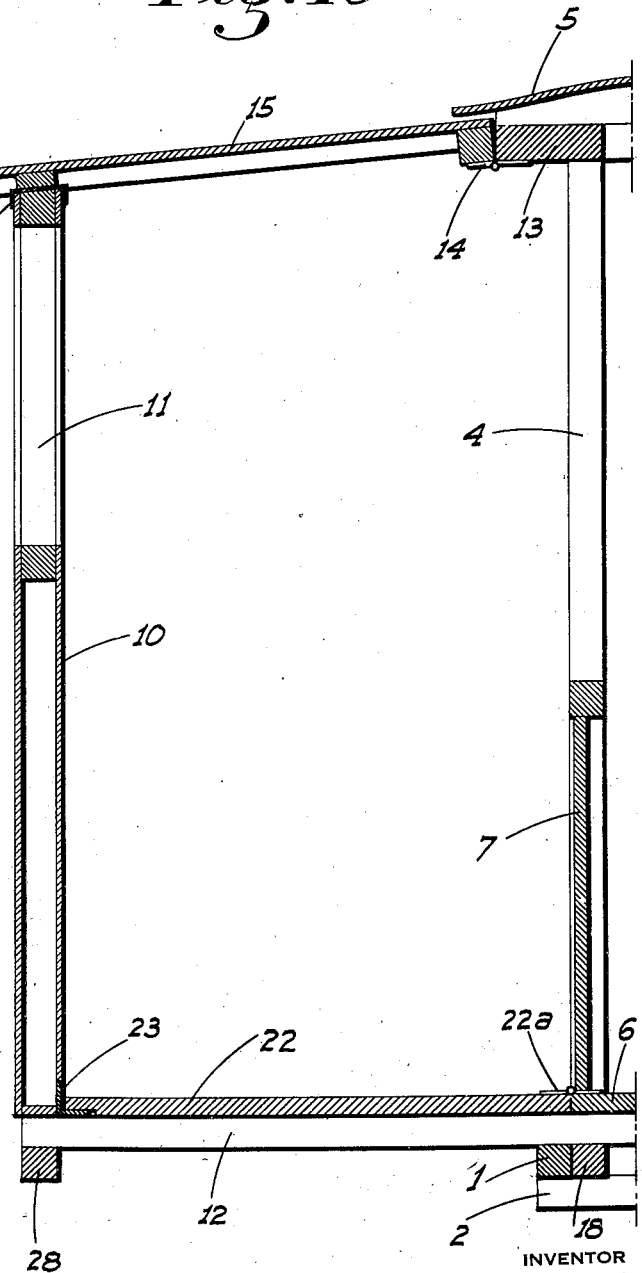
INVENTOR
Wm J. Pendry
BY
ATTORNEY July 2, 1935.  W. J. PENDRY  2,006,477
FOLDING CABIN
Filed April 24, 1933   6 Sheets-Sheet 6
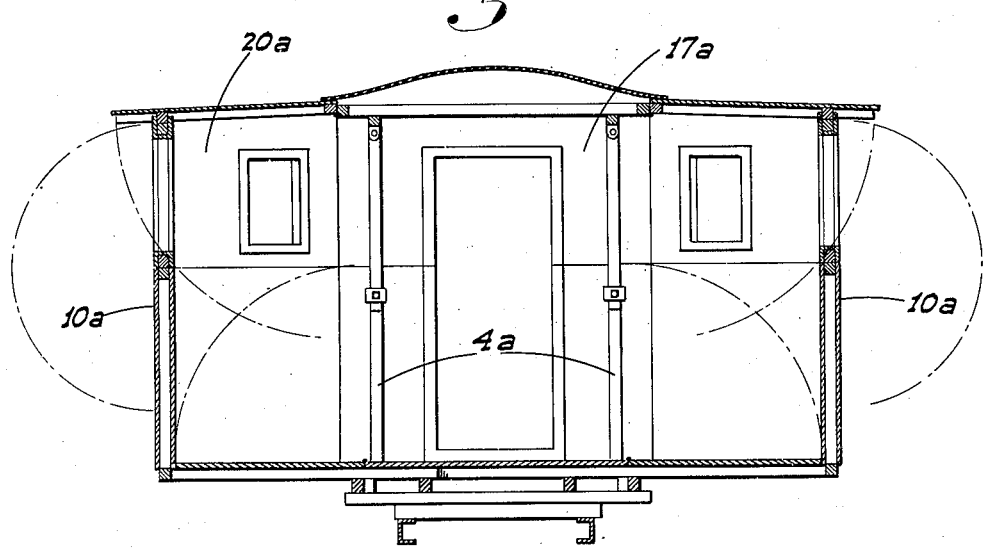
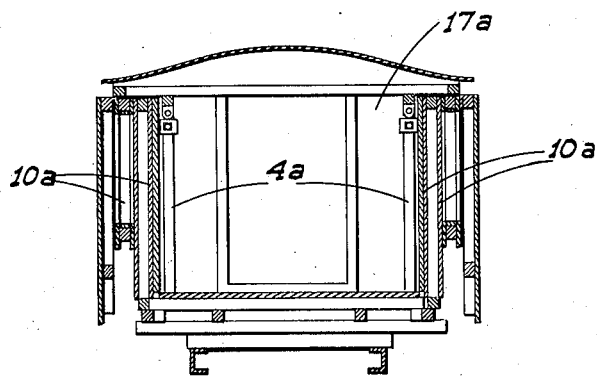
INVENTOR
Wm J. Pendry
BY
ATTORNEY Patented July 2, 1935

2,006,477

UNITED STATES PATENT OFFICE 2,006,477

FOLDING CABIN

William J. Pendry, Brentwood, Calif.

Application April 24, 1933, Serial No. 667,640

6 Claims. (Cl. 296—23)

This invention relates to portable or traveling cabins, particularly of a type adapted to be arranged as a trailer to be drawn behind a motor vehicle.

The principal object of my invention is to provide a structure of this general character so constructed that when in use it forms a cabin of ample proportions for adult use in all its dimensions; but when it is to be transported it may be folded or relatively collapsed so as to be compact and occupy a small amount of space on the highway, both transversely and lengthwise of the same. In this manner the cabin when being hauled will not interfere with traffic nor will it be unduly clumsy or unwieldy to manipulate.

A further object is to construct the device so that the walls, roof and flooring are of a rigid and substantial nature as distinguished from the flexible nature of a canvas tent, and when set up or unfolded for use a rain and draft proof structure is provided, so as to be suitable for comfortable occupancy in all weathers.

I have initially designed the structure for use as a traveling lunch wagon, which may be transported to and quickly set up for use at any likely point along the road or in any place where crowds temporarily congregate, as at circuses, carnivals etc. The structure however is also admirably suitable for use as sleeping and living quarters on camping trips, or it may be used as a summer cabin at vacation resorts or by parties employed as fruit pickers or doing similar operations in the field some distance from their permanent abode.

In other words the special interior equipment necessary for adapting the cabin for lunch wagon purposes and as shown in the present drawings, is in itself no part of the invention and such equipment can be changed to suit the particular use for which the structure is built.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 3 is a fragmentary sectional plan of the structure at one end showing the walls extended but some of the hinged floor sections not lowered.

Fig. 4 is a similar view showing the assembly as practically completed.

Fig. 5 is a perspective view of the cabin completely set up and ready for use.

Fig. 6 is a cross section of the cabin folded on one side and unfolded on the other.

Figs. 9 and 10 are enlarged fragmentary transverse sections of the structure on one side showing the parts in their folded and unfolded positions respectively.

Figs. 11 and 12 are transverse sections of a modified form of cabin construction showing the same unfolded and folded respectively.

Figure 1:
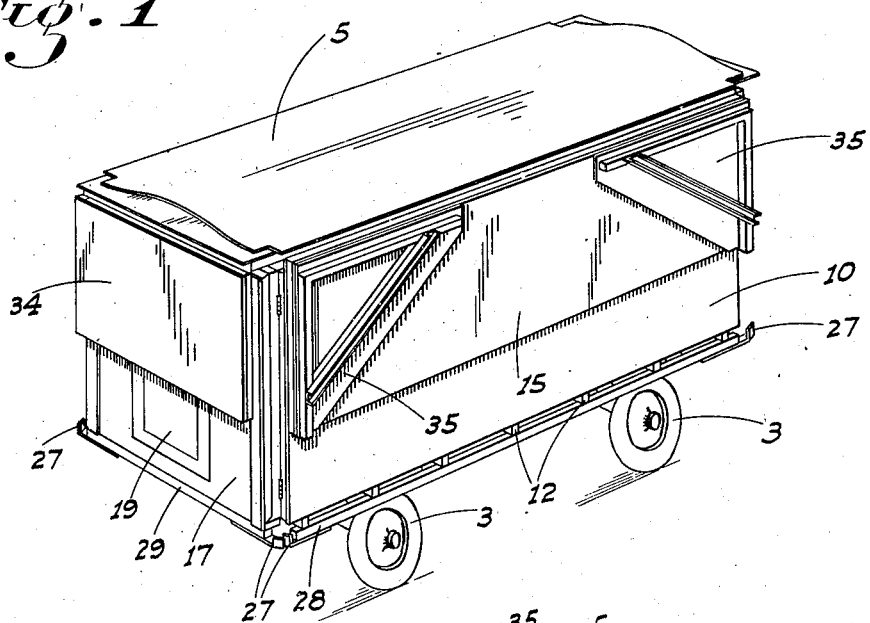
Fig. 1 is a perspective view of the cabin folded and in its transporting position.

Referring now more particularly to the characters of reference on the drawings, and particularly at present to Figs. 1 to 10, what I consider as the chassis or permanent portion of the cabin comprises longitudinal beams 1 connected by upper and lower cross beams 2, said beams together forming a rigid structure which may be supported on one or more pairs of wheels 3. These wheels are preferably removable so that the cabin may be set adjacent the ground if desired as when contemplating a long stay at any one place. The width and length of the chassis conform to road requirements and are preferably of dimensions substantially the same as those of an ordinary passenger vehicle.

Posts 4 upstand from the chassis frame adjacent its corners and support the permanent roof portion 5; while a flooring 6 is permanently mounted on those beams 2 which are above the beams 1 and which consequently serve as floor joists. In the present instance I also show relatively low side walls 7 extending from end to end of the chassis adjacent its side edges, one wall removably supporting a corner 8 and the other having folding table, seat and partition units indicated generally at 9 mounted on the outside of the same and forming eating booths, the space between the side walls being reserved for cooking and serving purposes. This interior arrangement is used when the structure is designed as a lunch wagon and as indicated in the preamble it may be changed as desired to suit the needs of the individual owner since this interior equipment with the exception of the posts 4 does not affect the features of the invention.

Figure 7:
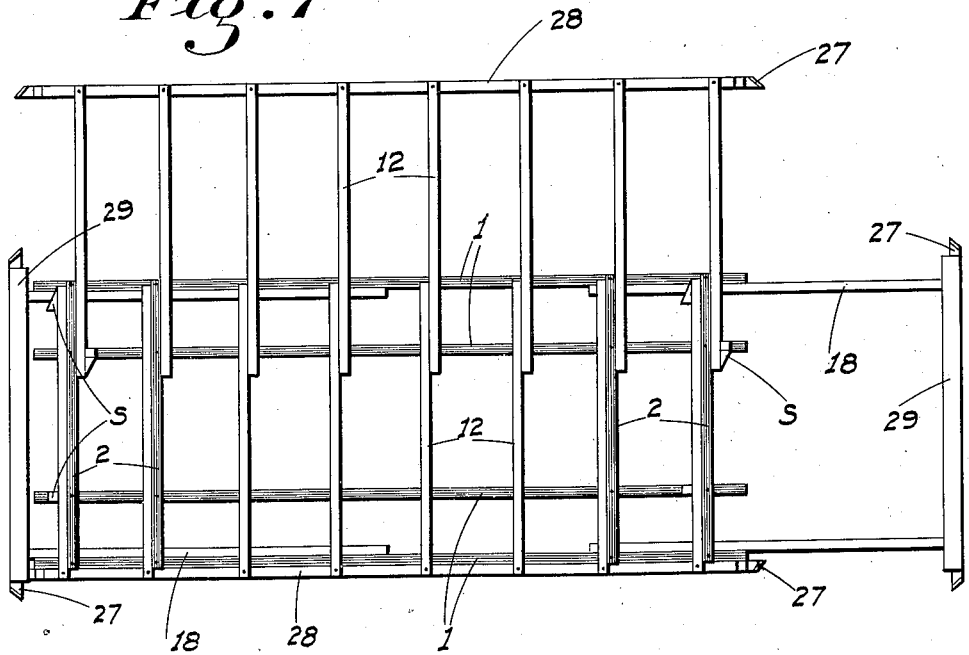
Fig. 7 is a plan view of the supporting or floor frames of the relatively stationary and movable parts of the cabin.

Opposed side walls 10 preferably having windows 11 therein extend the full height and length of the chassis. These walls are rigidly and separately mounted at the bottom in connection with beams or joists 12 which extend transversely of the chassis in offset relation to each other and to the beams 2 as shown in Fig. 7. These joists 12 are slidably disposed between and guided by the floor and the beams 1 so as to rest on the latter and so as to lie on the same level as the upper cross beams 2. Cooperating stops S between the joists and the beams 1 limit the outward movement of said joists and their upstanding walls.

Longitudinal caps 13 extend between the posts 4 under and inwardly of the side edges of the roof 5 and serve as supporting means for downwardly folding hinges 14 which are connected to the adjacent edges of roof sections 15. These sections when the walls 10 are folded in against the chassis hang down on the outside of the same, as shown in Fig. 1, then covering and protecting the windows. When said walls are unfolded the roof sections are swung up so as to extend over the top of the same and are then overlapped by the roof 5 so as to make a leak-proof joint. Inverted channel members 16 extend along the roof sections 15 and straddle the top of the walls 10 so as not only to prevent lateral deflection of the walls but serving to make a draft-tight fit with said walls.

Similarly the end walls 17 of the cabin are separately mounted at the bottom on posts 18 which extend lengthwise of the chassis and are disposed in guiding relation to the beams 1 on the same level or between the upper and lower beams 2. The outward sliding movement of these joists is also of course limited by suitable means similar to that shown and described in connection with the joists 12. The end walls preferably have doors 19 but these may be omitted in certain cases, or depending on the particular use for which the structure is designed.

Figure 2:
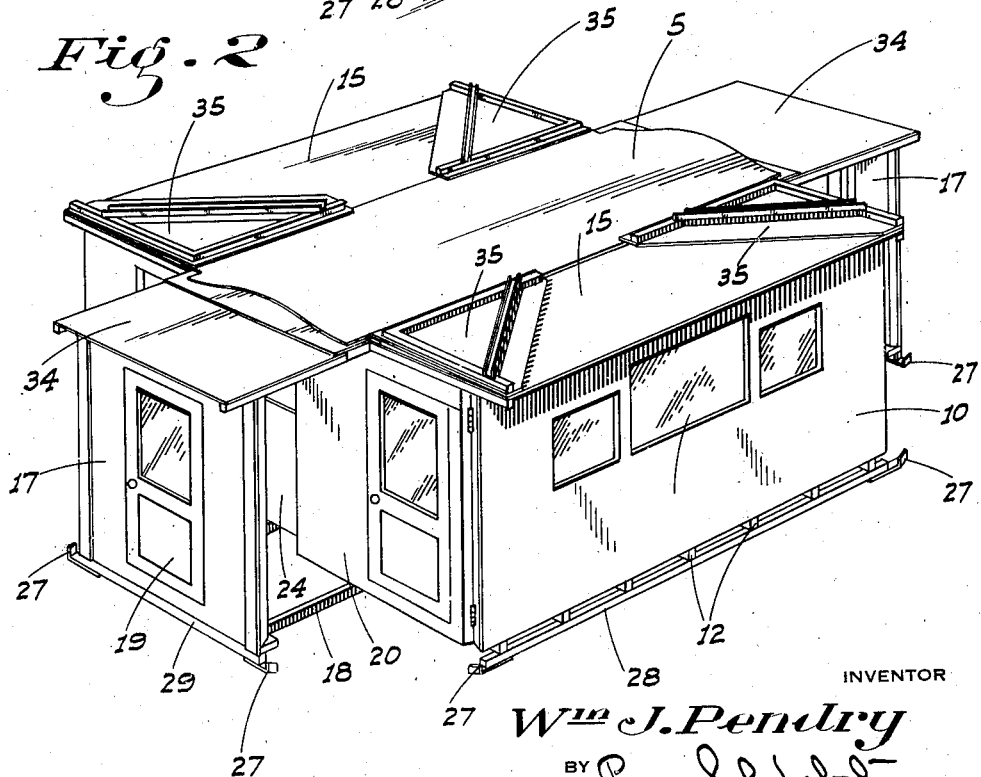
Fig. 2 is a similar view showing the walls extended but the structure not completely set up.

When the side and end walls are unfolded or drawn out from the chassis gaps between their adjacent ends and which are disposed diagonally of the chassis are obviously formed. To close these gaps I provide diagonal end walls 20 which are hingedly connected to the ends of the side walls 10 and the rear ones of which, for lunch wagon purposes, have doors 21 to give access to the eating spaces to the sides of the central area. When the structure is folded these diagonal walls are turned so as to lie at right angles to the side walls and are then disposed in overlapping relation to each other, as shown in Fig. 2. When unfolded certain diagonal walls swing out and then have snug engagement with the adjacent ends of the end walls.

Flooring sections 22 are hinged along the side edges of the main floor 6 as shown at 22a so as to extend to the walls 10 when the latter are drawn out and so as to be then supported on the joists 12. The outer edges of said floor sections rest on ledges 23 secured on the joists against the walls so as to make a draft-tight fit and also aid in preventing sagging of the flooring. Other floor sections 24 are hinged to the ends of the main flooring to extend to the end walls 17 when the latter are outstretched, while triangular floor sections 25 to cover the space between the diagonal walls 20 and the floor sections 22 and 24 are hingedly connected to the opposite side edges of the latter, as shown in Fig. 4. When the structure is folded or collapsed the floor sections are swung up so as to lie vertically as shown in Figs. 3, 6 and 9; the triangular sections 25 being folded inwardly against the sections 24, as shown in Fig. 3.

Figure 8:
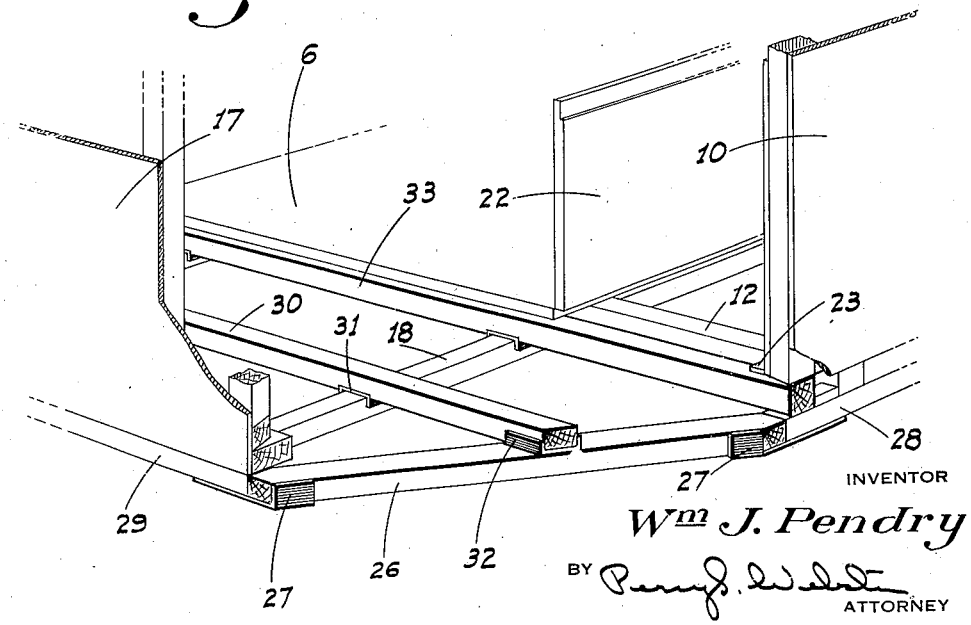
Fig. 8 is a fragmentary perspective view of one end of the structure with the diagonal end walls removed and showing the supporting and floor joist arrangement.

Before the flooring can be lowered into place after the walls are drawn out however provision must be made to properly support the sections 24 and 25 intermediate their edges, since the joists 18 of the end walls are on a lower level than the joists 12 and the corresponding floor sections, as shown in Fig. 8. I therefore provide beams 26 to extend between the outer corner of the end and side walls and removably engaging cradles 27 secured to and projecting from the corresponding ends of the bottom sills 28 and 29 of the side and end walls respectively, so that said beams 26 and the sills as well as the joist 18 are all on the same level. A cross joist 30 is then placed between the beams 26 intermediate their ends and said joist extends across the joist 18 and has cradles 31 engaging said joist 18. Said cross joist also rests on the beams 28 and is engaged by cradles 32 on the latter so as to be removably held in a definite location.

The upper surface of this cross joist is on the same level as the joists 12 or the same as that of the bottom of the floor 6. A similar cross joist 33 is removably mounted on the ends of the sills 28 just beyond the adjacent cradles 27 and has cradles similar to those on the joist 30 engaging the joists 18 as shown in Fig. 8. This joist 33 projects partially under the adjacent end of the flooring 6 so as to support the adjacent ends of the flooring sections 22 as well as the corresponding ends of the floor sections 24 and 25.

When unfolding the structure the end and side walls are pulled out first, the beams and joists above described being then mounted in place. After this the diagonal walls 20 are opened out to position, as shown in Fig. 3, and the various floor sections may then be lowered in place, as shown in Fig. 4.

Roof sections 34 cover the area between the ends of the main roof 5 and the end walls when the latter are pulled out, said roof sections being hinged onto the main roof and engaging the end walls in the same manner as the roof sections 15 engage their side walls. This roof arrangement still leaves triangular gaps between the adjacent edges of the roof sections 15 and 34 and the diagonal walls 20. I therefore provide similarly shaped roof sections 35 to cover such gaps which are hinged onto the ends of the roof sections 15 and are adapted when not in use to fold over onto the same, as shown in Fig. 2. These roof sections are opened up to position after all the other parts are in position for use. To make a water-tight connection between the different hinged roof sections, the sections 15 and 35 are covered along their hinged edges by flexible waterproof strips 36, while the opposite edges of the sections 35 overlap the sections 35 or as shown in Fig. 5.

The above construction provides full standing head room inside the cabin, which makes the structure relatively high on the road when being transported. To cut down on the height somewhat for transportation I may make the structure as shown in Figs. 11 and 12. In this form of construction the main roof supporting posts 4a are made sectional and telescoping for vertical sliding movement relative to each other. Also the end, side and diagonal walls 10a, 17a, and 20a respectively are each made in the form of a pair of sections hinged together intermediate their top and bottom as shown. In this manner the height of the structure when collapsed or folded may be little greater than one-half the height it would normally be, as shown in Fig. 12, and making the structure correspondingly compact and low for hauling.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A trailer comprising a main roofed cabin section, side and end walls on said section slidably mounted in connection therewith for outward movement, additional walls to close the gap between said side and end walls when moved out, hinged along the ends of the side walls and adapted to lie at right angles thereto when said walls are folded against the main section, folding roof sections hinged on the roof of the main section to extend to and engage the side and end walls when the latter are extended, and additional roof sections to cover the gaps between the adjacent ends of the first named roof sections flexibly mounted thereon for folding movement against the same when not in use.

2. A folding cabin comprising a main roofed cabin section, side and end walls on said section slidably mounted in connection therewith for outward movement, additional walls to close the gap betwen said side and end walls when moved out, hinged along the ends of the side walls and adapted to lie at right angles thereto when said walls are folded against the main section, floor sections hingedly connected to the main section for upward folding movement and adapted to extend to the side and end walls when said walls are extended, and additional floor sections to cover the gaps between the adjacent ends of said first named floor sections hingedly mounted thereon for folding and unfolding movement relative thereto.

3. In a folding cabin, a main cabin section having transverse floor supporting joists and a floor thereon, side walls slidably mounted in connection with said section for outward movement relative thereto, floor sections hinged onto the floor for upward folding movement and adapted to extend to said side walls when the latter are extended, an end wall, beams projecting from said end wall and slidably mounted in connection with and under said joists, cradles projecting from the adjacent ends of the walls, beams removably supported by and extending between adjacent cradles on a common level with each other and with the first named beams, a cross joist removably supported by and extending over all said beams intermediate their ends; said cross joist being on the same level as said floor joists, and a flooring structure to cover the area outlined by the end wall, the ends of the floor and floor sections and the removable beams, hingedly mounted on the end of the floor.

4. A structure as in claim 3, with means between said cross joist and the beams to detachably locate said joist in a definite position.

5. A folding cabin comprising a main section having a floor, a roof, and means supporting the roof from the floor; side and end walls separate from said supporting means and adapted to enclose the area of said main section, means separately mounting said walls for horizontal outward movement from such enclosing position, additional walls hinged on the ends of the side walls for folding movement parallel to and adjacent the ends of the main section and arranged to close the gaps between the side and end walls when extended, and a roofing structure flexibly mounted on the roof of the main section to cover the area between said main section and said walls when the latter are moved outwardly.

6. In a folding cabin a main section having a floor frame comprising longitudinal side beams, and upper and lower transverse joists between which said beams are disposed, a floor secured on the upper joists, longitudinal joists slidable between said upper and lower joists and guided by the beams, transverse joists placeable on said longitudinal joists and the same height as said upper joists, and a floor separate from and adapted to rest on said last named transverse joists.

WILLIAM J. PENDRY.